United States Patent [19]

Huttenlocher et al.

[11] Patent Number: 5,539,841
[45] Date of Patent: Jul. 23, 1996

[54] METHOD FOR COMPARING IMAGE SECTIONS TO DETERMINE SIMILARITY THEREBETWEEN

[75] Inventors: Daniel P. Huttenlocher, Ithaca, N.Y.; Eric W. Jaquith, Amherst, N.H.

[73] Assignee: Xerox Corporation, Stamford, Conn.

[21] Appl. No.: 430,106

[22] Filed: Apr. 27, 1995

Related U.S. Application Data

[63] Continuation of Ser. No. 170,075, Dec. 17, 1993.

[51] Int. Cl.$^6$ .............................. G06K 9/68; G06K 9/40
[52] U.S. Cl. ........................................ 382/218; 382/257
[58] Field of Search ................................. 382/257, 256, 382/218

[56] References Cited

U.S. PATENT DOCUMENTS

| | | | |
|---|---|---|---|
| 2,905,927 | 9/1959 | Reed | 340/149 |
| 3,133,266 | 5/1964 | Frishkopf | 340/146.3 |
| 3,295,105 | 12/1966 | Gray et al. | 340/146.3 |
| 4,010,445 | 3/1977 | Hoshino | 340/146.3 |
| 4,155,072 | 5/1979 | Kawa | 340/146.3 |
| 4,326,190 | 4/1982 | Borland et al. | 340/146.3 |
| 4,400,828 | 8/1983 | Pirz et al. | 382/30 |
| 4,477,926 | 10/1984 | Linger et al. | 382/49 |
| 4,481,664 | 11/1984 | Linger et al. | 382/8 |
| 4,495,644 | 1/1985 | Parks et al. | 382/3 |
| 4,558,461 | 12/1985 | Schlang | 382/9 |
| 4,644,585 | 2/1987 | Crimmins et al. | 382/257 |
| 4,701,960 | 10/1987 | Scott | 382/3 |
| 4,731,857 | 3/1988 | Tappert | 382/9 |
| 4,747,148 | 5/1988 | Watanabe et al. | 382/8 |
| 4,764,972 | 8/1988 | Yoshida et al. | 382/13 |
| 4,809,344 | 2/1989 | Peppers et al. | 382/32 |
| 4,821,333 | 4/1989 | Gillies | 382/55 |
| 4,864,628 | 9/1989 | Scott | 382/21 |
| 4,918,740 | 4/1990 | Ross | 382/9 |
| 4,926,490 | 5/1990 | Mano | 382/9 |
| 4,933,977 | 6/1990 | Ohnishi et al. | 382/9 |
| 4,949,281 | 8/1990 | Hillenbrand et al. | 364/518 |
| 4,949,392 | 8/1990 | Barski et al. | 382/61 |
| 4,956,869 | 9/1990 | Miyatake et al. | 382/22 |
| 4,977,603 | 12/1990 | Irie et al. | 382/34 |
| 5,142,589 | 8/1992 | Lougheed et al. | 382/9 |
| 5,179,419 | 1/1993 | Palmquist et al. | 382/1 |
| 5,179,596 | 1/1993 | Weingard | 382/15 |
| 5,214,719 | 5/1993 | Budd et al. | 382/23 |
| 5,216,725 | 6/1993 | McCubbrey | 382/9 |
| 5,272,764 | 12/1993 | Bloomberg et al. | 382/55 |
| 5,291,560 | 3/1994 | Daugman | 382/30 |
| 5,305,389 | 4/1994 | Palmer | 382/14 |

FOREIGN PATENT DOCUMENTS

W093/12610  6/1993  WIPO .......................... H04N 1/411

OTHER PUBLICATIONS

"F6365 Japanese Document Reader" Fujitsu Sci. Tech. J., 26, 3, pp. 224–233 (Oct. 1990).

"An Efficiently Computable Metric for Comparing Polygon Shapes," by Arkin; Chew, Huttenlocher, Kedem & Mitchell; *Proceedings of First Annual ACM–SIAM Symposium on Discrete Algorithms*, Jan. 1990 (pp. 129–137).

(List continued on next page.)

*Primary Examiner*—Leo Boudreau
*Assistant Examiner*—Monica S. Davis
*Attorney, Agent, or Firm*—Duane C. Basch

[57] ABSTRACT

A method for comparing two image sections consisting of a plurality of image signals, or pixels, where each image section represents a token (e.g., character, symbol, glyph, string of components, or similar units of semantic understanding), in order to identify when similar tokens are present within the image sections. The invention further operates without the need for individually detecting and/or identifying the components making up the tokens. In one embodiment, the method relies upon the detection of connected components within words to first isolate individual word tokens and then applies a two stage process where dilated images of the tokens are compared with model representations of the tokens to determine the relative similarity therebetween.

21 Claims, 12 Drawing Sheets

OTHER PUBLICATIONS

"Comparing Images Using the Hausdorff Distance" by Hutfenlocher, Klanderman and Rucklidge; Dept. of Computer Science, Cornell University, Ithaca, NY 14853; CUCS TR 91–1211 (revised) Jun. 1991.

"A Multi-Resolution Technique for Comparing Images Using the Hausdorf Distance" by Huttenlocher and Rucklidge; TR 92–1321 Dec. 1992; Dept. of Computer Science, Cornell University, Ithaca, NY.

Conference Paper; K. Yokosawa; "Human–Based Character String Image Retrieval from Textual Images", 1989.

Journal Paper; R. M. Bozinovic, S. N. Srihari; "Off–Line Cursive Script Word Recognition"; 1989.

50 — Cal.App. 1961. Police officers who had in-
formation from informants that defendant was
dealing in narcotics and who knew what de- — 54
fendant looked like and kind of automobile he
was driving and who at time they approached
automobile, as another person was getting in,
saw an object in left hand of defendant, who
tried to drop his hand out of sight toward
floorboard of automobile, had reasonable cause
to believe that defendant had committed a fel-
ony, and arrest was lawful. West's Ann.
Health & Safety Code, §§ 11500, 11530.—
People v. Williams, 16 Cal.Rptr. 842.

Cal.App. 1961. Officers had reasonable
cause before they entered to believe defend-
ant was committing a felony and that he had
a narcotic unlawfully in his possession, where
they observed defendant's act of throwing
away capsules immediately after front door of
house he entered was bolted and officer an-
nounced his presence, and arrest was lawful
even though officers had no warrant.—People
v. Armenta, 17 Cal.Rptr. 470.

Cal.App. 1962. Evidence disclosed that po-
lice officers, who had been informed that de-
fendants had purchased heroin and had a nar-
cotics record went to residence for further in-
vestigation and heard men rushing toward
bathroom and the toilet flush, had probable
cause to believe that a crime was being com-
mitted in their presence and entry thereafter
to effect arrest was authorized and concur-
rent search and seizure, as incident to arrest,
was lawful. West's Ann.Health & Safety
Code, § 11500.—People v. Reyes, 23 Cal.Rptr.
705.

Cal.App. 1962. Conduct by a person indi-
cating an attempt to dispose of contraband
by putting it into his mouth or throwing it
away is a material factor in determining prob-
able cause for arrest without a warrant.—
People v. Tabb, 25 Cal.Rptr. 541.

*FIG.3*

METHOD FOR COMPARING IMAGE SECTIONS TO DETERMINE SIMILARITY THEREBETWEEN

This is a division of application Ser. No. 08/170,075, filed Dec. 17, 1993.

This invention relates to a method of comparing image tokens forming words, a plurality of connected components, or similar units of semantic understanding represented within an array of image data by shape, without a requirement for individually detecting and/or identifying the characters, symbols, glyphs, or components making up the tokens.

CROSS REFERENCE

The following related applications are hereby incorporated by reference for their teachings:

"Optical Word Recognition by Examination of Word Shape," Huttenlocher et al., Ser. No. 07/796,119, filed Nov. 19, 1991, now abandoned;

"Method for Comparing Word Shapes," Huttenlocher et al., Ser. No. 07/795,169, filed Nov. 19, 1991 now abandoned;

"Method of Determining Boundaries of Words in Text," Huttenlocher et al., Ser. No. 07/794,392, file Nov. 19, 1991, now U.S. Pat. No. 5,321,770;

"A Method of Deriving Wordshapes for Subsequent Comparison," Huttenlocher et al., Ser. No. 07/794,391, filed Nov. 19, 1991, now abandoned;

"Methods and Apparatus for Automatic Modification of Semantically Significant Portions of a Document Without Document Image Decoding," Huttenlocher et al., Ser. No. 07/795,174, filed Nov. 19, 1991, now U.S. Pat. No. 5,384,863;

"Method and Apparatus for Summarizing a Document Without Document Image Decoding," Without et al., Ser. No. 07/794,543, filed Nov. 19, 1991 now abandoned;

"Method and Apparatus for Supplementing Significant Portions of a Document Selected Without Document Image Decoding With Retrieved Information" to Withgott et al., Ser. No. 07/795,419, filed Nov. 19, 1991 now abandoned; and "Method for Identifying Word Bounding Boxes in Text," Huttenlocher et al., Ser. No. 08/169,949, field Feb. 2, 1993, now U.S. Pat. No. 5,410,611.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

MICROFICHE APPENDIX

An appendix comprising 3 microfiche having a total of 260 frames thereon is included as part of this application.

BACKGROUND OF THE INVENTION

Text in electronically encoded documents (electronic documents) tends to be found in either of two formats, each distinct from the other. In a first format, the text may be in a bitmap format, in which text is defined only in terms of an array of image data or pixels, essentially indistinguishable from adjacent images which are similarly represented. In this format, text is generally incapable of being subjected to processing by a computer based on textual content alone and must be segmented into image units for processing as described, for example, in the copending application for "Methods and Apparatus for Automatic Modification of Semantically Significant Portions of a Document Without Document Image Decoding," Huttenlocher et al., Ser. No. 07/795,174, filed Nov. 19, 1991. In a second format, hereinafter referred to as a character code format, the text is represented as a string of character codes (e.g. ASCII code). In the character code format, the image or bitmap of the text is not available.

Conversion from bitmap to character code format using an optical character recognition (OCR) process carries a significant cost in terms of time and processing effort. Each bitmap of a character must be distinguished from its neighbors, its appearance analyzed, and in a decision making process, identified as a distinct character in a predetermined set of characters. As examples of OCR techniques, U.S. Pat. No. 4,864,628 to Scott discloses a method for reading data which circumnavigates a character image. U.S. Pat. No. 4,326,190 to Borland et al. teaches a character feature detection system for reading alphanumeric characters. In addition, U.S. Pat. No. 4,956,869 to Miyatake et al. suggests a more efficient method for tracing contour lines to prepare contour coordinates of a figure within an image consisting of a plurality of lines.

When the electronic document has been derived by scanning an original, however, image quality and noise in its reproduction contribute to uncertainty in the actual appearance of the bitmap. A degraded bitmap appearance may be caused by an original document of poor quality, by scanning error, or by similar factors affecting the digitized representation of the image. Therefore, the decision process employed in identifying a character has an inherent uncertainty about it. A particular problem in this regard is the tendency of characters in text to blur, or merge. Most character identifying processes commence with an assumption that a character is an independent set of connected pixels. When this assumption fails, due to the quality of the input image, character identification also fails.

The following patents illustrate particularly relevant approaches to improving character detection. U.S. Pat. No. 4,926,490 to Mano discloses a method and apparatus for recognizing skewed characters on a document. A rectangle is created around each character image, oriented with the detection orientation rather than the image orientation, and position data for each rectangle is stored in a table. The rectangle is created by detecting a character's outline. U.S. Pat. No. 4,558,461 to Schlang discloses a text line bounding system wherein skewed text is adjusted by analyzing vertical patches of a document. After the skew has been determined, each text line is bounded by determining a top, bottom, left, and right boundary of the text line. U.S. Pat. No. 3,295,105 to Gray et al. discloses a scan controller for normalizing a character in a character recognition apparatus wherein a character is analyzed by determining certain character characteristics including top, bottom, right and left character boundaries. U.S. Pat. No. 4,918,740 to Ross discloses a processing means for use in an optical character recognition system wherein sub-line information is used to analyze a character and identify it. U.S. Pat. No. 4,949,392 to Barski et al. discloses a document recognition system which recognizes an unknown document form by comparison against a library of templates, thus allowing for the intelligent association of text characters in certain locations of the unknown document to aid in the recognition thereof. U.S. Pat. No. 5,142,589 to Lougheed et al. discloses a system for repairing digital images of broken characters which first dilates the character strokes to fill small gaps therein and then erodes the image to conform to the original strokes, thereby producing recognizable characters before separation into individual digits for recognition. U.S. Pat. No. 5,214,719 to Budd et al. teaches a character recognition system and method for teaching and recognizing characters. The method obtains an image, identifies a character, samples the character, and then does a vector correlation of the sample points to stored points of known characters to recognize the character.

OCR methods have sought to segment images in various fashions. For example, U.S. Pat. No. 4,558,461 to Schlang suggests a text line bounding system for nonmechanically adjusting for skewed text in scanned text. The skew angle of the text is then established, following which the text lines are statistically bounded. The actual text data is then rotated according to the orientation established for conventional processing. U.S. Pat. No. 4,809,344 to Peppers et al. teaches preprocessing of character recognition so as to obtain data necessary for character recognition. Page segmentation is performed by simultaneously extracting a plurality of features, separation between lines, separation between characters, and separation between the lines and the characters are simultaneously performed, and a calculation time for normalizing the separated individual characters can be reduced, thereby performing preprocessing required for character recognition systematically at high speed.

OCR methods have sought to improve reliability by use of dictionary word verification methods, such as described in U.S. Pat. No. 4,010,445 to Hoshino. However, the underlying problem of accurate character detection of each character in a character string remains. The article "F6365 Japanese Document Reader" Fujitsu Sci. Tech. J., 26, 3, pp. 224–233 (October 1990) shows a character reader using the steps of block extraction, skew adjustment, block division, adjacent character segmentation, line extractions, and character recognition by pattern matching, with dictionary checking, and comparison.

It might be desirable, to identify a set of characters forming a word or character string as such, as shown, for example, in U.S. Pat. No. 2,905,927 to Reed, in which for a text string, a set of three scans across the text, parallel to its reading orientation are employed, each scan deriving information about transitions from black to white across the scan. U.S. Pat. No. 4,155,072 to Kawa suggests a similar arrangement, operable to produce a set of values representative of the leading and trailing edges of the character.

In addition to an OCR system operating on printed or typed textual images, numerous references deal with recognition of handwritten text which has been converted into an electronic representation. U.S. Pat. No. 4,731,857 to Tappert shows processing a word with the segmentation and recognition steps combined into an overall scheme. U.S. Pat. No. 4,764,972 to Yoshida et al. suggests a recognition system for recognizing a plurality of handwritten characters. U.S. Pat. No. 4,933,977 to Ohnishi et al. discloses a method for identifying a plurality of handwritten connected figures, including identifying and prioritizing branches of the connected figures. Finally, U.S. Pat. No. 5,216,725 to McCubbrey teaches a computer system for mail sorting of hand-addressed envelopes that first calculates an interstroke distance for character strokes within a digitized address and then, using the interstroke distance, the strokes are grouped into words for further processing.

The choice of entire words as the basic unit of recognition, has also been considered in signature recognition, where no attempt is made to maintain characters as having separate identities, and is suggested by U.S. Pat. No. 3,133,266 to Frishkopf, which still relies on subsequent feature identification methods for identifying characteristics of the image of the character. Signature recognition has also used comparison techniques between samples and known signatures, as shown in U.S. Pat. No. 4,495,644 to Parks et al. and U.S. Pat. No. 4,701,960 to Scott which suggest that features plotted on x-y coordinates during the signature process can be stored and used for signature verification.

Alternative modes of expressing character recognition are known, U.S. Pat. No. 4,949,281 to Hillenbrand et al. teaches the use of polynomials for generating and reproducing graphic objects, where the objects are predetermined in the form of reference contours in contour coordinates.

Certain signal processing techniques for comparing known signals to unknown signals are available if the word can be expressed in a relatively simple manner. U.S. Pat. No. 4,400,828 to Pirz et al. discloses a spoken word recognizor wherein an input word is recognized from a set of reference words by generating signals representative of the correspondence of an input word and the set of reference words and selecting a closest match. U.S. Pat. No. 4,977,603 to Irie et al. teaches an arrangement for pattern recognition utilizing the multiple similarity method, capable of taking structural features of a pattern to be recognized into account, so that sufficiently accurate pattern recognition can be achieved even when the pattern may involve complicated and diverse variations. "An Efficiently Computable Metric for Comparing Polygon Shapes," by Arkin, Chew, Huttenlocher, Kedem and Mitchell, *Proceedings of First Annual ACM-SIAM Symposium on Discrete Algorithms*, January 1990 (pp. 129–137) suggests that metrics can be established for shape matching.

The present invention seeks to avoid the problems inherent in OCR techniques, while potentially utilizing the fundamental characteristics of words and text strings. Word-to-word spacing tends to be larger than character to character spacing, and therefore, allows improved isolation and identification of tokens comprised of character strings as compared to identification of individual characters within the tokens. OCR methods, however, tend to require several correct decisions about aspects of a character preparatory to a correct identification, including identification of portions of the character as ascenders, descenders, curves, etc., all of which are fallible. The present invention, on the other hand, facilitates more reliable identification and recognition of sets of connected components (referred to herein as tokens), such as words, symbols or strings of characters. In one embodiment, the present invention employs word boundaries to initially determine characteristics of the text or symbol lines within the image. Subsequently, comparison of the tokens isolated within the boundaries to one another or to known tokens in a token image dictionary may be completed. Hence, classifications of the token are not made until the comparisons occur, thereby eliminating the impact of invalid partial classifications which may cause subsequent erroneous comparisons and decisions.

In examining potential uses of computer processed text, it has been determined that, at least in certain cases, deriving each letter of the word is not required for processing requirements. Thus, for example, in a key word search of a text image, rather than converting, via OCR techniques, each letter of each word, and subsequently determining from the possibly flawed character coding whether one or more key words are present, a computer might instead generate and compare the shapes of tokens within the text image with the shape of a token representing the key word, and evaluate whether the key word is present by token shape comparison. The output of such a system would most likely present an indication of the presence of the key words to an accuracy acceptable to a user. Furthermore, it is believed that the novel method described herein will have processing speed advantages over methods designed for character recognition. Moreover, the present invention may also have applications in image editing systems and is, therefore, not intended to be limited to the embodiment described.

The probability of an incorrect determination of a letter by OCR methods may be relatively low, however, the probabilities are multiplicatively cumulative over an entire word—applying the product rule. Hence, using OCR to convert words into character code strings, prior to searching for or recognizing the words may result in considerable error. The present invention utilizes token level, or in a text recognition embodiment word level, segmentation of the image data to enable subsequent recognition in a manner similar to that which humans use while reading or skimming a text passage. Moreover, the described token shape recognition process has several advantages. First, the bitmap image data is not irretrievably lost, and a reasonable representation of the bitmap remains so that an user may examine a reconstructed bitmap for character, symbol, glyph or word determination, if desired. Second, by utilizing connected components (tokens), each symbolic element (e.g., character) has the context of the entire token (e.g., word) to assist in the token's comparison to other token shapes. For example, the presence of a poorly formed letter in a word token only minimally affects the total identifiability of the word shape, by only slightly decreasing the probability of a match between two compared tokens representing the word. In addition, when considered in comparison with the performance of OCR methods, which are more likely to result in mistakes for words having more characters, the present invention generally enables a more robust word recognition capability.

OCR methods convert from a bitmap to a representative character code, thereby losing the informational content of the bitmap. In general, the process is not reversible to obtain the original bitmap from the character code. However, identification of word tokens based on shape, as described in accordance with one aspect of the present invention, retains bitmap information further into the recognition process, thereby enabling reconstruction of the bitmap.

SUMMARY OF THE INVENTION

In accordance with the present invention, there is provided a method of comparing at least two image sections having a plurality of image signals, each image section representing a token, to identify similar tokens, comprising the steps of: (a) storing image signals representing a first token in a first model memory; (b) producing, in a first image memory, a dilated representation of the first token; (c) storing image signals representing a second token in a second model memory; (d) producing, in a second image memory, a dilated representation of the second token; (e) comparing the image signals stored in the first model memory with the image signals stored in the second image memory to determine a first similarity metric; (f) comparing the image signals stored in the second model memory with the image signals stored in the first image memory to determine a second similarity metric; and (g) determining if the first token is similar to the second token in response to the first and second similarity metrics.

In accordance with another aspect of the present invention, there is provided a method of comparing at least two image sections having a plurality of image signals, wherein a first image section represents a token from an unknown image object and a second image section represents a token from a known image object stored in a dictionary of images, to identify the unknown token as matching the token previously stored in the dictionary of images, comprising the steps of: (a) storing image signals representing an unknown token in a first model memory; (b) producing, in a first image memory, a dilated representation of the unknown token; (c) replicating image signals representing a known token stored in a dictionary of images to a second model memory; (d) producing, in a second image memory, a dilated representation of the known token; (e) comparing the image signals stored in the first model memory with the image signals stored in the second image memory to determine a first similarity metric; (f) comparing the image signals stored in the second model memory with the image signals stored in the first image memory to determine a second similarity metric; and (g) determining if the unknown token is similar to the known string of symbols in response to the first and second similarity metrics.

BRIEF DESCRIPTION OF THE DRAWINGS

Other objects and advantages of the present invention will become apparent from the following description taken together with the drawings in which:

FIG. 3 shows an image sample of example text over which the inventive process will be demonstrated;

The Microfiche Appendix contains source code listings for a series of image manipulation and signal processing routines which have been implemented to demonstrate the functionality of the present invention. Included in the Appendix are three sections which are organized as follows:

Section A, beginning at page 1, comprises the declarative or "include" files which are commonly shared among the functional code modules;

Section B, beginning at page 72, comprises code listings for various functions which are used to determine word boundaries in accordance with a preferred embodiment of the present invention and the subject of copending application Ser. No. 08/169,949, some of which are generally described in the following description;

Section C, beginning at page 185, comprises code listings for various functions for the word shape comparison operations that are further described in the following description.

DESCRIPTION OF THE PREFERRED EMBODIMENT

Figure 1:
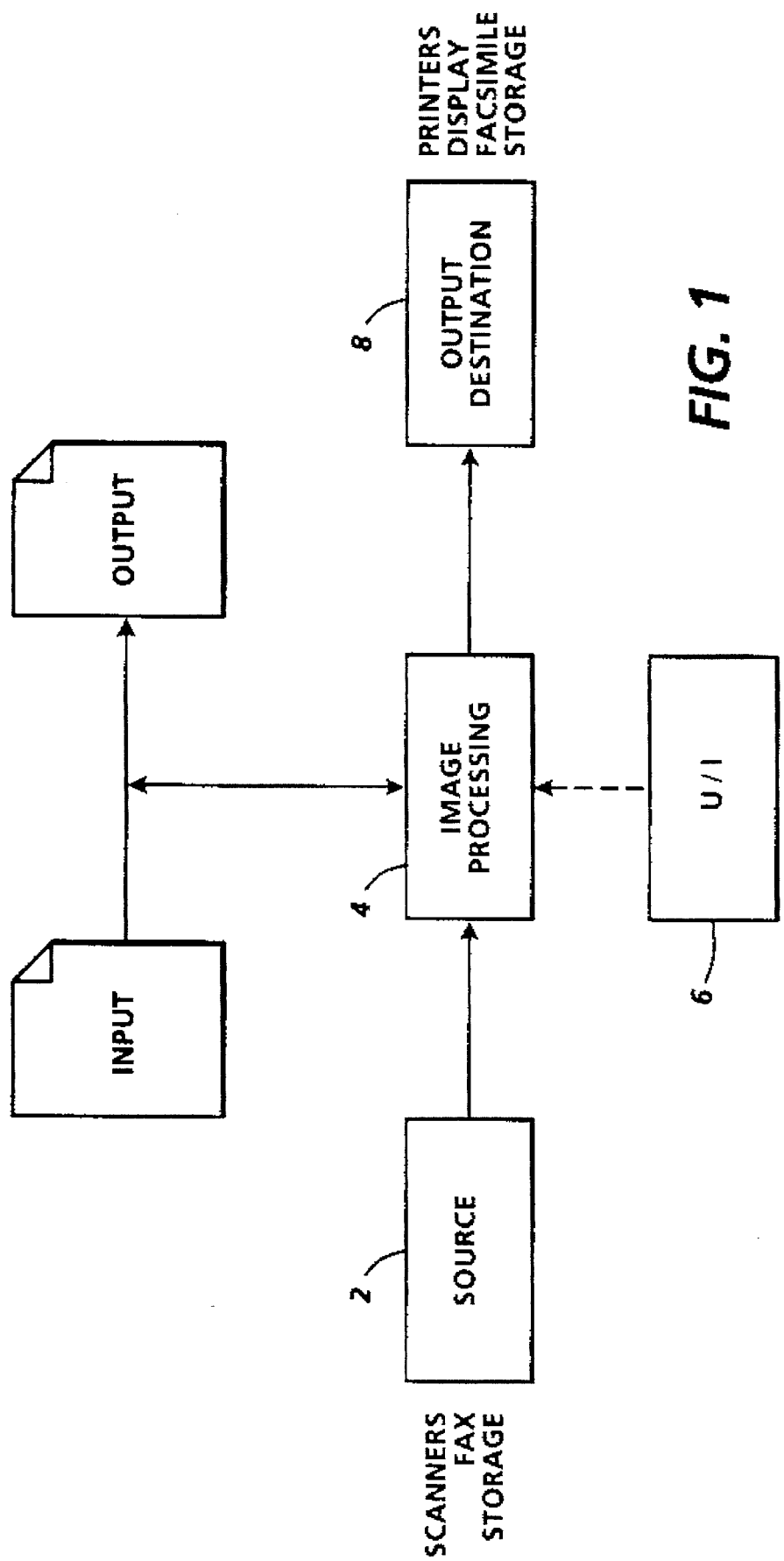
FIG. 1 shows a generalized system diagram of an image processing system in which the present invention would find use.

Referring now to the drawings where the showings are for the purpose of illustrating a preferred embodiment of the invention, and not for limiting same, FIG. 1 shows a generalized image processing system, which covers numerous situations in which the present invention may find advantageous use. Generally, a source image may be derived from a source image derivation system 2, which may be a scanner, facsimile device, or storage system. The source image is forwarded to a computer processing device 4 which may be any of several well known devices including the inventive device described herein. In response to commands entered at user interface 6, processing device 4 produces an output at an output device 8, which may be a printer, display, facsimile device or other storage device. In essence, as is shown in the upper portion of FIG. 1, an input document is directed into a system and an output document is retrieved from it.

In the following description, an image is generally described as an image bitmap, where an image is represented as a plurality of rasterized image signals. These signals, commonly referred to as pixels, are typically denoted as black when intended to represent a corresponding mark or active position on a document from which they were produced. However, these constructs have been used to enable the description of the present invention, and are in no way intended to limit the domain of such to black-and-white or binary images. Rather, the present invention is genera applicable across a broad range of image representation techniques. Moreover, the present invention is generally intended for determining the similarity of tokens within or between images. One embodiment where the present invention finds particular use is in determining the similarity of word objects within word boundaries, although it also has applications in image editing and compression systems and is, therefore, not intended to be limited solely to the embodiment hereinafter described.

Figure 2:
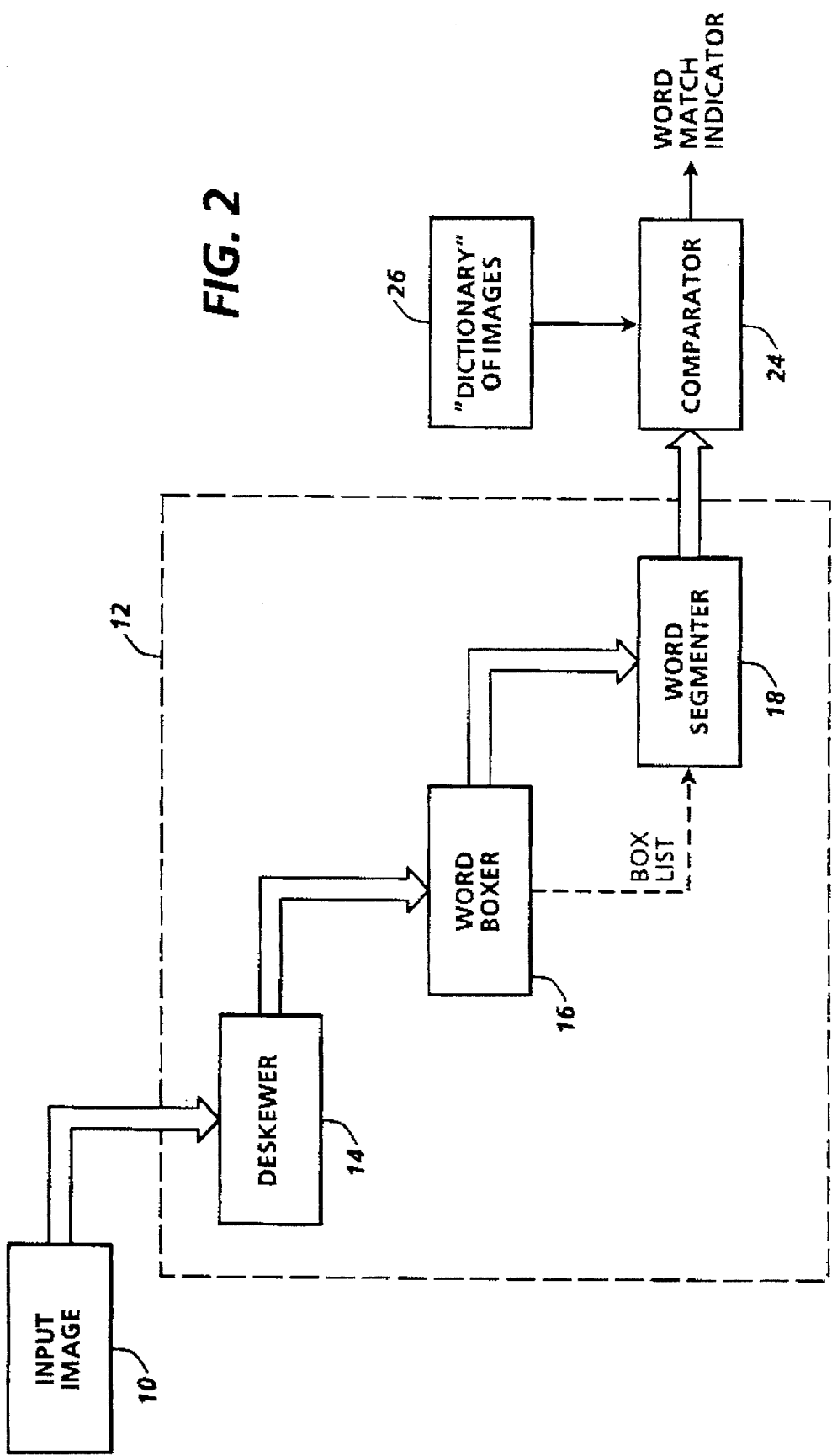
FIG. 2 shows a block diagram of the arrangement of system components forming one embodiment of the inventive token recognition system as applied to word images.

FIG. 2, shows a system which embodies the present invention for determining, segmenting, and comparing words in terms of their shapes. It will, of course, be recognized that each element of the system may be many devices, or may simply be a program operated within a single device. Similarly, while a preferred embodiment for word object recognition is described herein, the comparison techniques which form the basis of the present invention do not require the rigorous pre-processing operations described with respect to this particular embodiment.

Beginning with an input bitmap 10, whose source is indeterminate, and not part of the invention, a bitmap is initially directed to a segmentation system 12, in which boundaries of tokens (words, character strings, or other units of semantic understanding), will be determined. Initially, the image bitmap passes through deskewer 14, which determines the angle of orientation of text in the image and corrects for the orientation. Using the deskewed image produced by the deskewing operation, at word boxer 16, the boundaries of word tokens are determined, so that along with token boundaries, boundaries of lines of text within the image may also be identified. At word segmenter 18, the word token boundaries are applied to the image bitmap so that each word group in the image may be isolated in reading order and subsequently treated as a single unit. As used herein, "word", "symbol string" or "character string" refer to a set of connected alphanumeric or punctuation elements, or more broadly tokens, which form a partial or complete unit of semantic understanding. Such units of understanding are typically characterized in an image as separated by a spacing greater than that which separates the adjacent elements, signs or symbols forming the unit. At this point, alternative applications for the present invention, for example text or word editing systems, may employ the isolated word shapes for subsequent manipulation of the image. Hence, the present invention is not solely limited to use in a word recognition context.

Thereafter shape comparator 24 compares a word token shape representing the individual words in the image with known or previously identified word token shapes from a dictionary 26. In an alternative embodiment shape comparator 24 may be used to compare two or more word token shapes determined from image 10. In a preferred embodiment, comparator 24 employs a variant of the Hausdorff distance measure to characterize the degree of resemblance between the word token shapes being compared. More importantly, shape comparator 24 is not limited to the comparison of word token shapes from unrecognized strings of characters to known word token shapes. In a simplified context, comparator 24 is merely an apparatus for comparing the shape of one token against another to produce a relative indication of the degree of similarity between the two token shapes, represented in the present embodiment by the word match indicator output.

Figure 4:
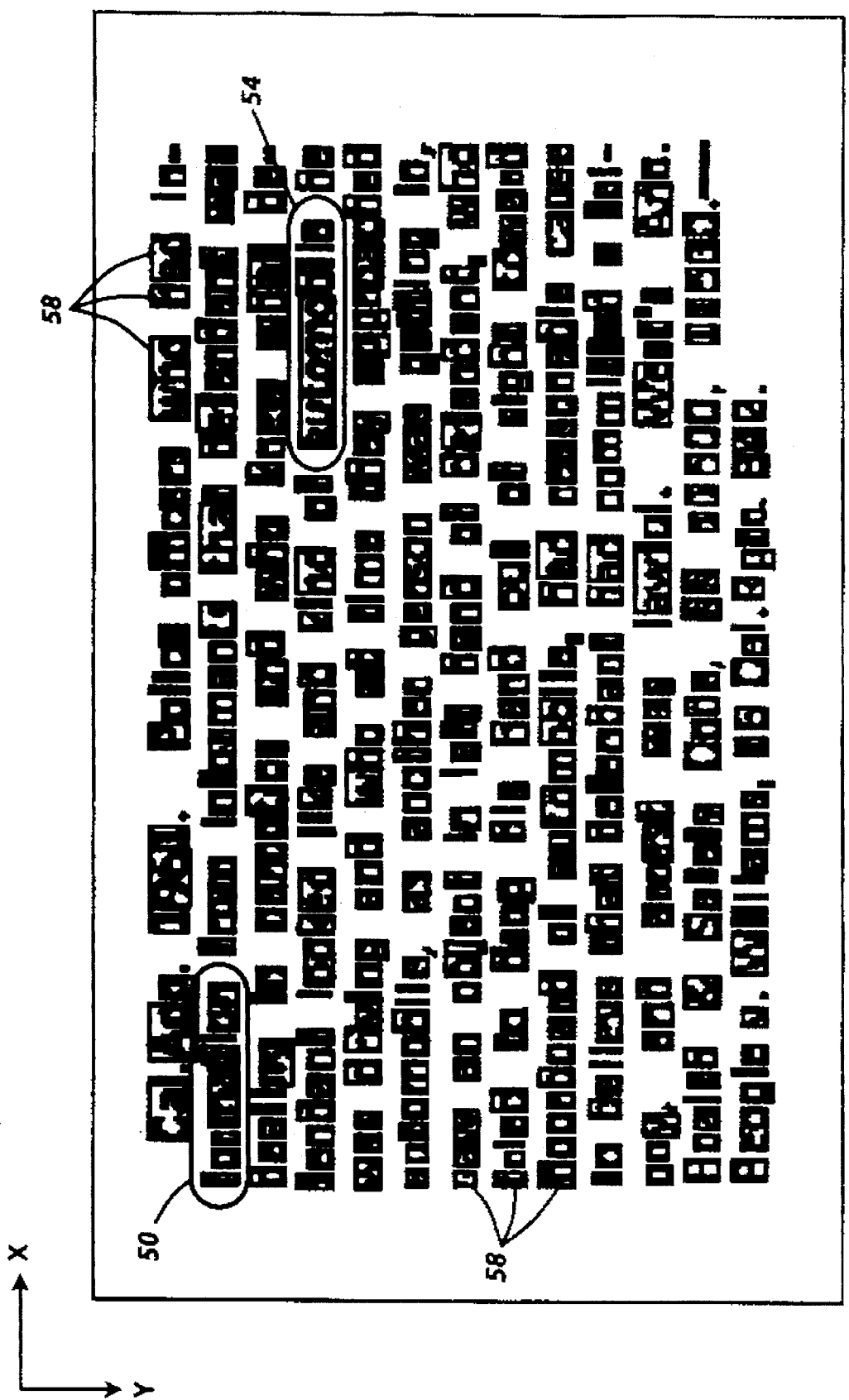
FIGS. 4, 5, and 6 illustrate portions of a scanned image of the example text at various stages of processing in accordance with the present invention.
Figure 5:
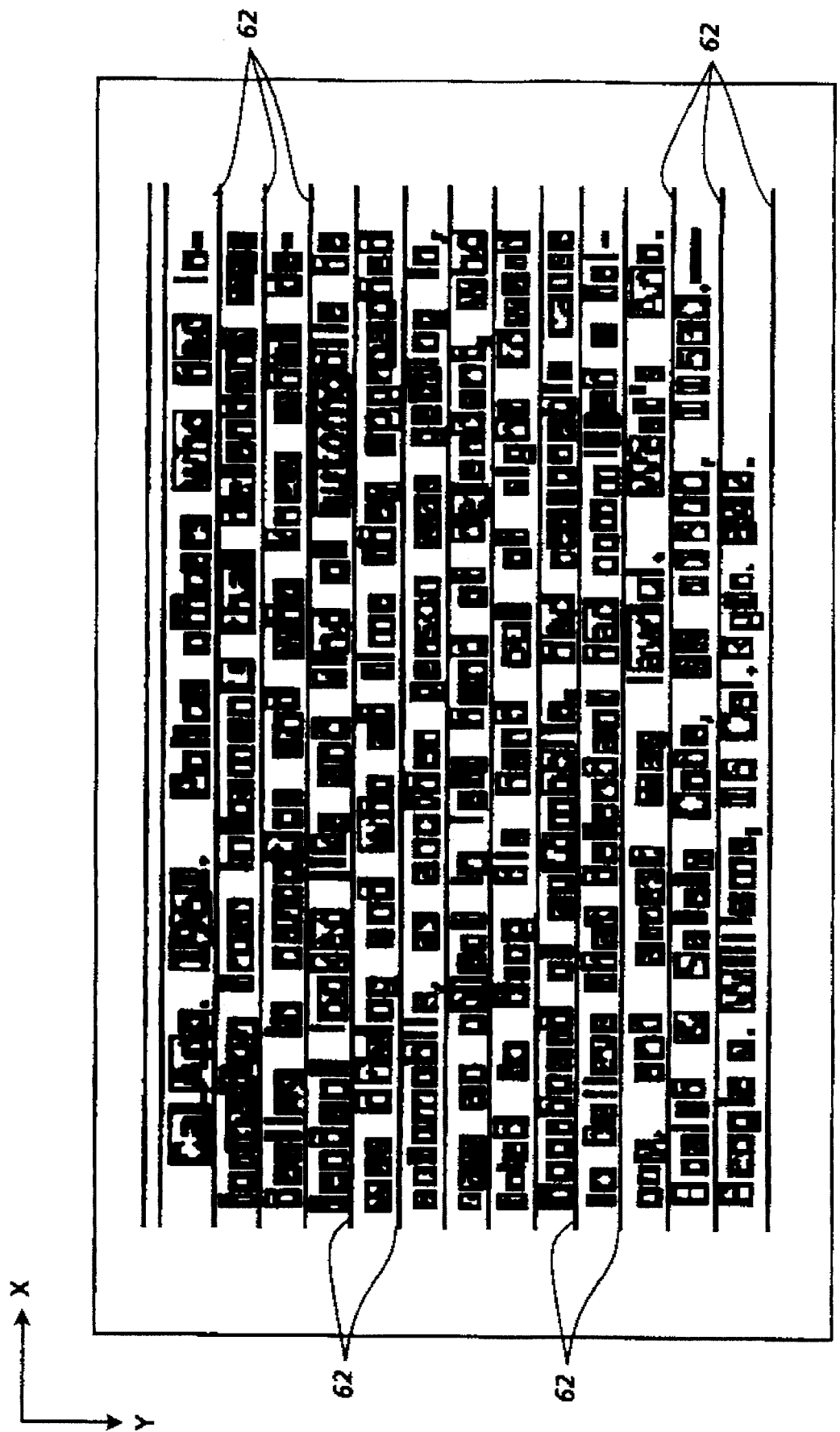
Figure 6:
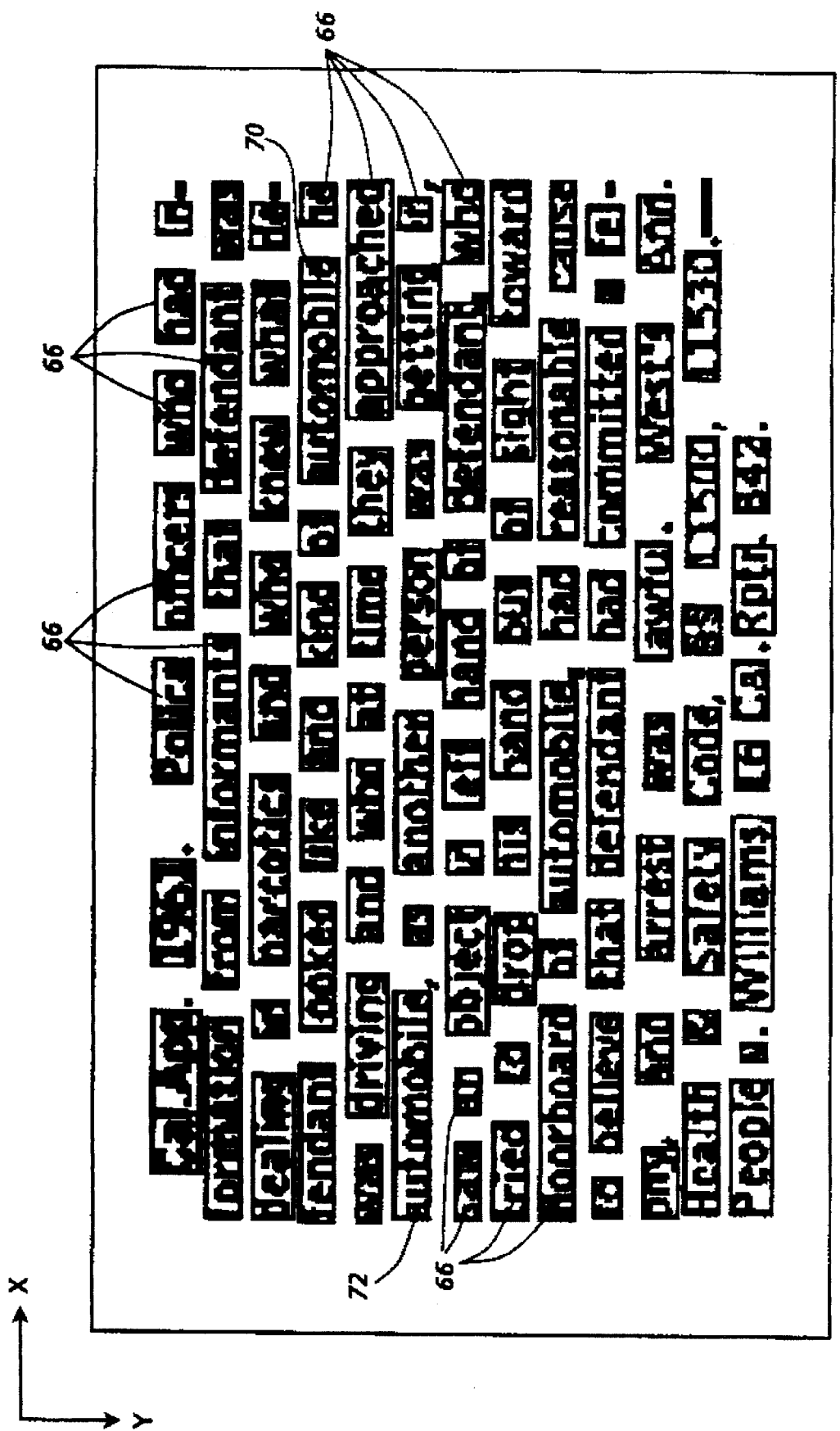

Having defined the general method and apparatus for determination and comparison of token shapes in the context of word images, each step in the shape comparison embodiment will now be more completely described. To further demonstrate the process of the invention, at FIG. 3, a sample image, taken from a public domain source is shown, having several lines of text contained therein. FIG. 3 demonstrates approximately how the image would appear on the page of text, while FIGS. 4, 5, and 6 show a portion of a scanned image of the page, which demonstrates an enlargement of the image of a bitmap that would present problems to known OCR methods. Looking at FIG. 3, for example, the image of word 50 "formation" in the second line and the image of word 54 "automobile" in the fourth line of the text image, it may be seen that several of the letters run together.

In one possible embodiment of the invention, deskewer 14, may incorporate elements described in the United States Patent application for "Coarse and Fine Skew Measurement," Ser. No. 07/737,863 by Wayher et al., hereby incorporated by reference, to determine the amount of skew present in the input image 10. Subsequently, any number of commonly known small-angle image rotation or skew correction methods may be employed to obtain a deskewed representation of the image.

Having deskewed the image, the tokens may be extracted in a number of ways, the selection of such being dependent upon the ultimate application of the token comparison. The comparison techniques embodied in the present invention may be used on the component tokens represented within boundaries 58 to identify those that match one another, or those that match a key token. Once identified, matching or known tokens within the larger document image can be labeled or similarly identified for subsequent processing. For example, subsequent processing may include identification, accession and extraction of information contained in the electronically represented document as described in "Methods and Apparatus for Automatic Modification of Semantically Significant Portions of a Document Without Document Image Decoding," by Huttenlocher et al. (application Ser. No. 07/795,174), and compression as described in the published application (WO-93/12610) for a "Method and Apparatus for Compression of Images" by Peter B. Mark et al., published Jun. 24, 1993. Although tokens representing portions of the document image may have immediate usefulness, further processing of the image to produce word-based tokens is preferred for purposes of recognizing words. The embodiment wherein the tokens are comprised of words or strings of related characters intended for comparison and recognition will now be described.

Figure 7:
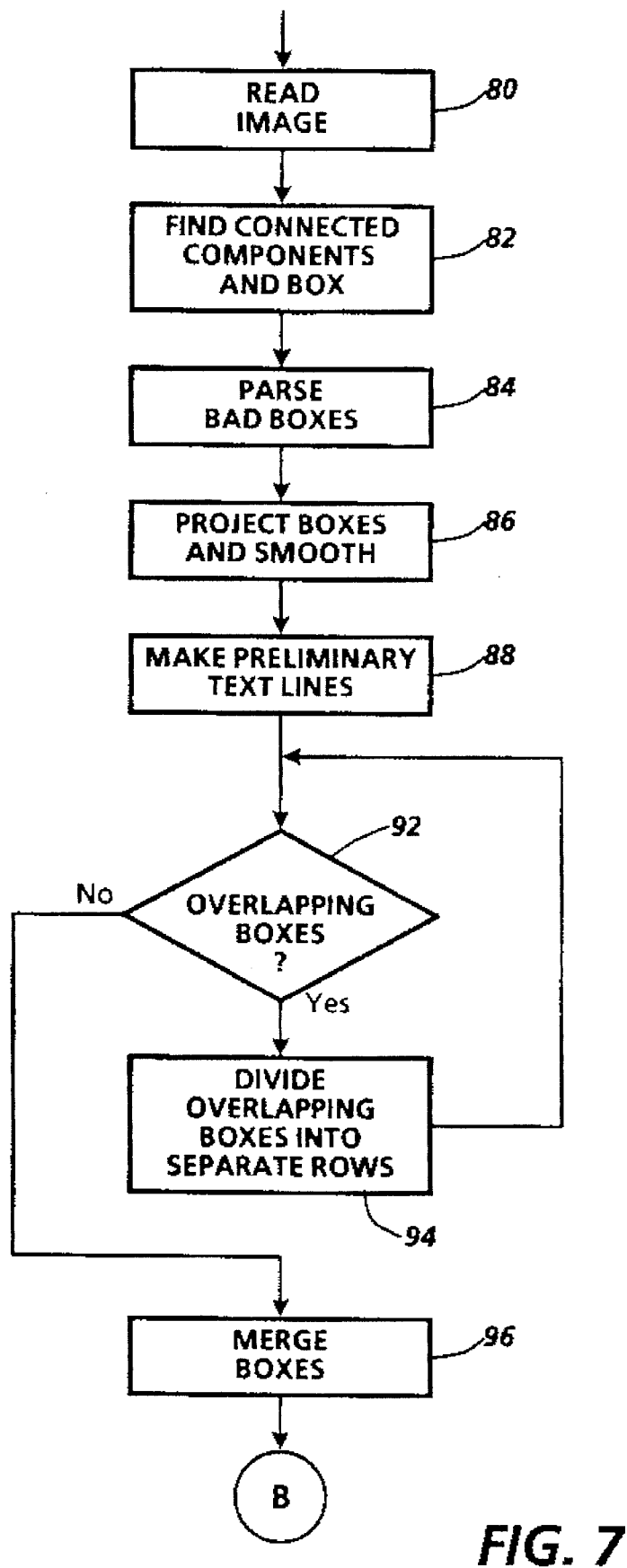
FIGS. 7 and 8 are flowcharts illustrating the process used to determine word boundaries within an image.
Figure 8:
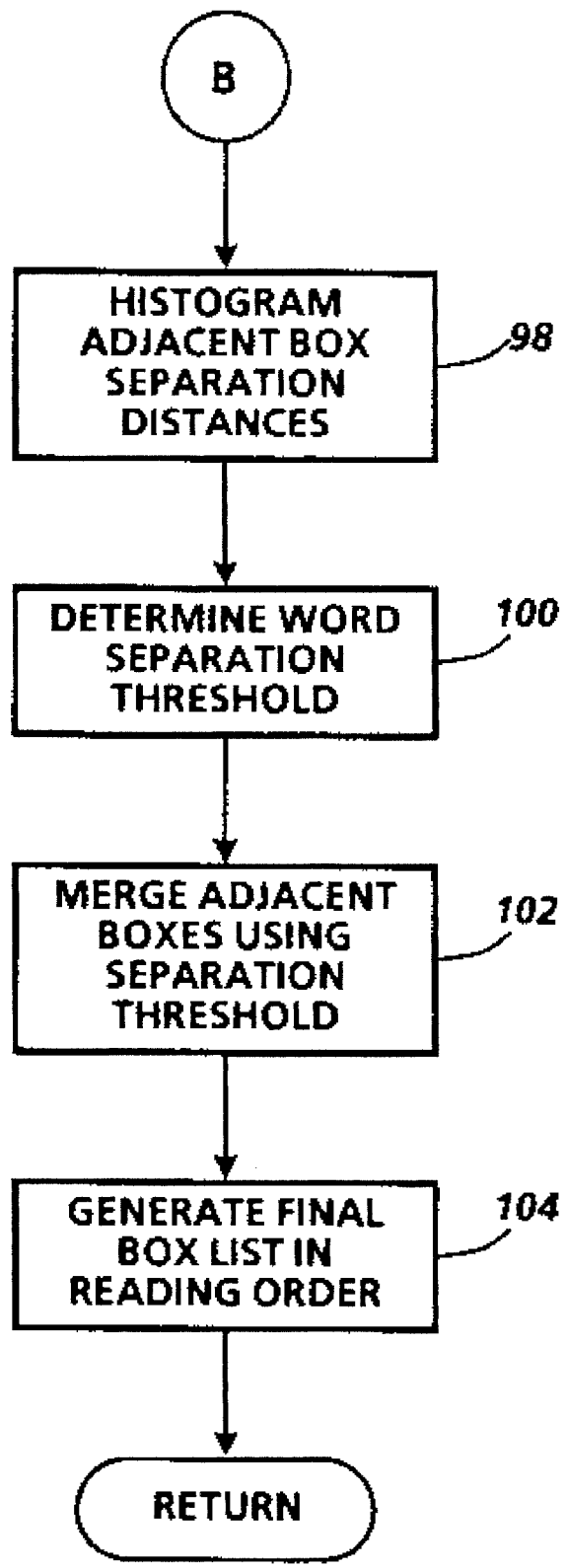

Referring again to FIG. 2, word boxer 16 operates on the deskewed image in accordance with the process steps depicted in the flowcharts of FIGS. 7 and 8. Although the following description of the process steps executed by the word boxer will be described with respect to operations executed by a programmable computer, there is no intent to limit the instant invention to such an embodiment. Beginning at step 80, the word boxer first reads in the input image of FIG. 3, having been deskewed if necessary by deskewer 14, using the function PackedReadFromPBM beginning on page 130 of the Appendix. The function simply accesses an image stored in memory, for example on a hard disk or similar storage device, and copies the image into a memory location allocated for the image, assigning pointers to the image as necessary.

Once the image has been retrieved, step 82 locates the connected components within the image. This process simply looks for a black pixel within a stored binary image. Once a black pixel is found an iterative process continues to locate all neighboring black pixels, and their neighboring black pixels, and so on, until the extent of the connected pixels is determined. More specifically, an eight-neighbor connection definition is employed. That is, if a pixel is adjacent to another pixel in one of its eight compass directions, then they are considered adjacent and will end up in the same connected component. Furthermore, this process is repeated until all black pixels within the image have been properly associated with other black pixels to form connected components. As illustrated in Figure 4, once connected pixels are associated, a rectangular box or boundary 58 is identified which reflects the maximum extents of the connected pixels, the rectangular box being oriented along the x-y axes of the image. Further details of the process may be found in the function FindCCBoxes beginning on page 116 of the Appendix.

Figure 9:
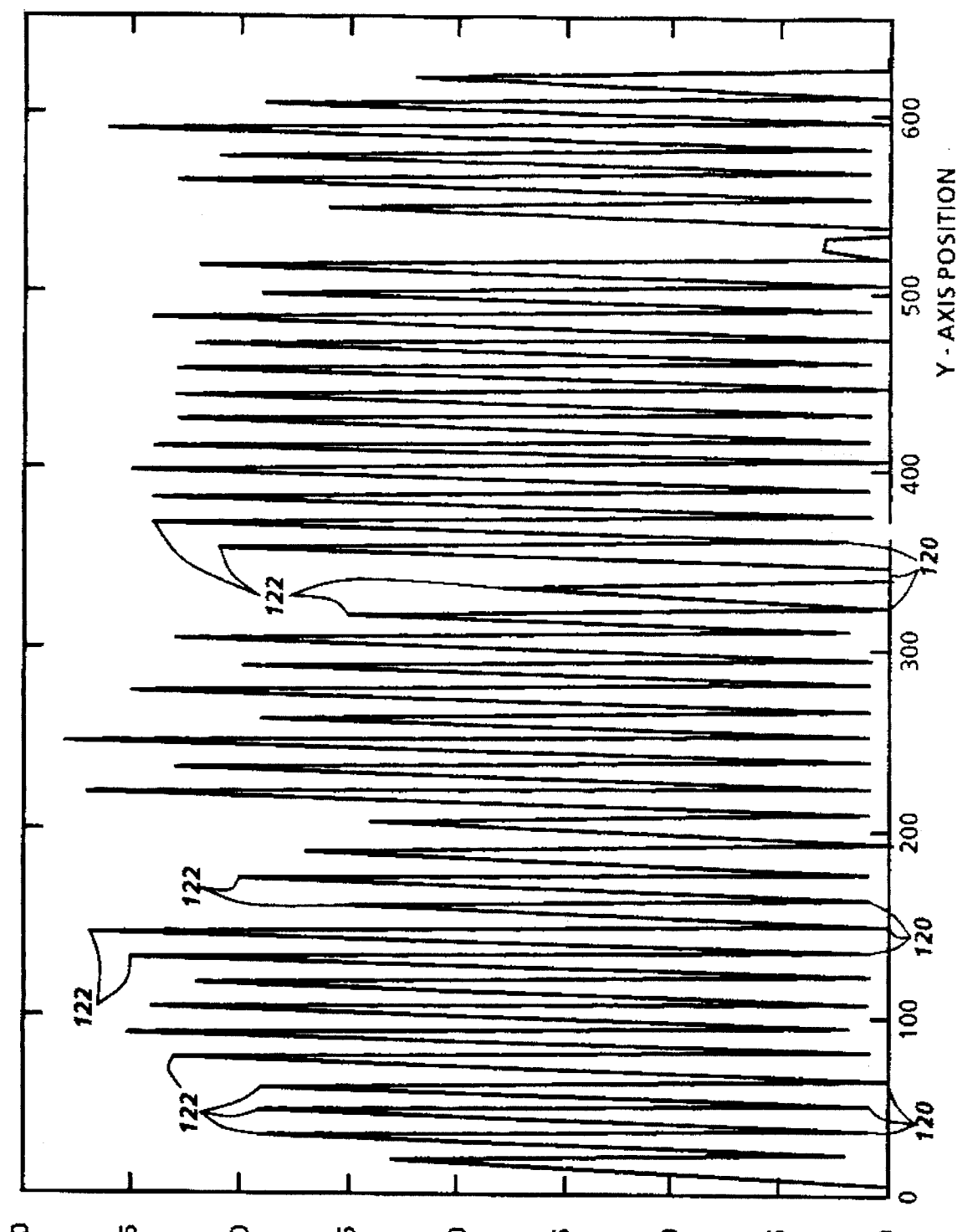
FIG. 9 is a graphical illustration of histogram data generated by step 86 of FIG. 7.

Having established bounding boxes around all connected component groups in the image, as illustrated by the portion of the image depicted in FIG. 4, the word boxer then parses out the "bad" boxes (not shown) within the identified set of connected component boxes or boundaries. Bad boxes are characterized in the function listing for ParseBadBoxes beginning on page 72 of the Appendix as: (a) tall boxes having heights greater than about twenty percent of the total image height, and greater than about a ninetieth percentile height for boxes within the image; or (b) short boxes having a height less than approximately one-third of the ninetieth percentile height. Once parsed, the remaining boxes are then projected onto the vertical or y-axis of the image (assuming the y-axis is the axis perpendicular to the direction of the deskewed text lines) using the function GetYProjections (Appendix p. 79) to generate a histogram which reflects the number of box boundaries as a function of position along the y-axis, as illustrated in FIG. 9 for the entire image of FIG. 3. In a preferred embodiment, a Gaussian smoothing operation (IntSmooth) may be applied to the y-axis projection histogram data prior to determining the text line locations. Then, from the resulting histogram, preliminary line or row boundaries can be identified as points along the y-axis of the image where valleys are present in the histogram. For example, as illustrated in FIG. 9, valleys or minima 120 are identifiable between adjacent peaks or maxima 122, and the valleys 120 thereby identify the positions of the interline spaces, illustrated by reference numeral 62 in FIG. 5. This operation is carried out by the *MakeRows function, the listing for which begins on page 82 of the Appendix, and is represented by step 88. Finally, when the preliminary text lines or rows are determined, the function PutBoxesInRows (Appendix p. 85) is executed to assign all connected component boxes to specific rows.

Having made a preliminary determination of the locations of the text lines or rows 62 the procedure MakeWordsAndSort (Appendix p. 77) is executed and initially assigns those connected component bounding boxes lying across two rows to a particular row. As reflected by steps 92, 94 and 96 of the flowchart, this procedure begins by further checking the validity of the preliminary text line identifications made in the previous step, step 88. First, the function CheckRow, found beginning on page 114 of the Appendix is executed to ensure that no text row divisions have been missed, as will be described. Generally, in looking at the connected components, none of the projections within a text row should overlap significantly in an x-axis projection unless they also overlap significantly in the y-axis direction. If the projections overlap, as identified by step 92, it would indicate that the identified row is quite probably two (or more) separate rows, and should be divided by finding another minimum in the y-axis projection graph. Also, boxes around small groups of connected components, such as those forming a dot over an "i" or underlining of a word within the text image must be ignored so as not to falsely trigger a further division of the text row.

Second, as represented by step 96, the remaining boxes which overlap one another along the x-axis direction are merged into a single box having a boundary enclosing the components which were merged. The merging procedure, MergeOverlaps, is found beginning on page 105 of the Appendix. In general, the process looks through boxes within a row, and identifies those boxes which overlap in the x-direction that also have at least some minimal overlap in the y-direction. Preferably the minimal y-direction overlap must be on the order of about fifty percent. For example, the scanned image might contain the word "fort" Upon scanning, the right-most side of the "f" box could overlap with the left-most side of the "o" box, thus when merging components for which boxes overlap along the x-axis the "f" and "o" boxes would be merged. The procedure also executes a size test, wherein boxes which are smaller than a predetermined size are not merged. Subsequently, the smaller boxes can serve to identify noise within the image which may be eliminated.

Figure 10:
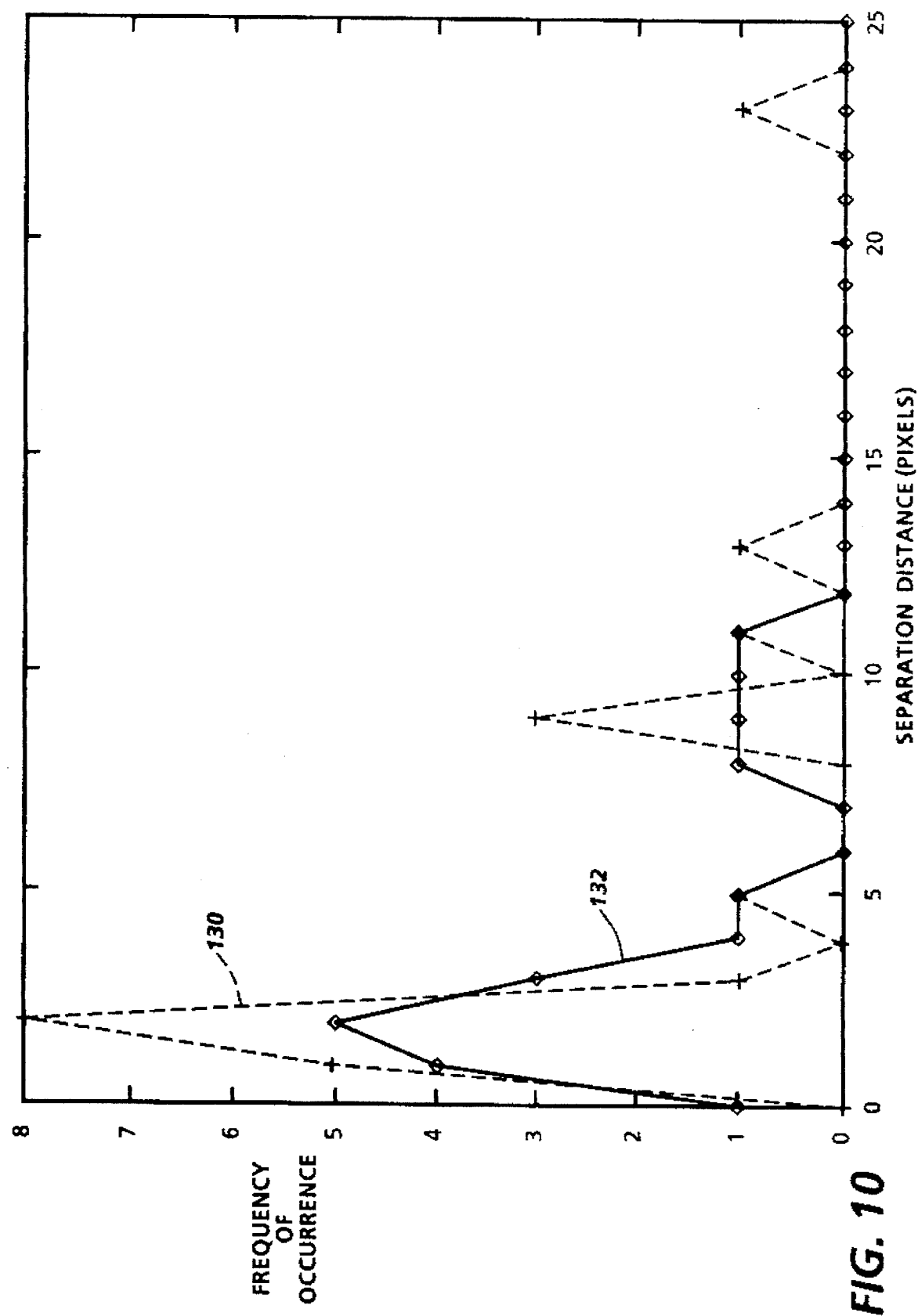
FIG. 10 is a graphical illustration of histogram data generated by step 98 of FIG. 8.

Third, having accurately located the text rows, the remaining boxes within the rows represent sets of connected components or tokens, some of which may need to be further combined to form words or similar elements of semantic understanding. To further merge adjacent components which form a word-based token within the scanned image, the MakeWordsAndSort procedure continues at step 98 by histogramming the separation distances between adjacent components with the text rows. The results of a typical text row distribution are shown in FIG. 10, where the dashed-line curve represents the raw histogram data and the solid-line curve represents data which has been smoothed. As would be expected, the resulting curve generally shows a bi-modal distribution, where the first set of peaks 130 and 132 reflect the distribution of separation distances for the inter-character spacings, while the second set of peaks reflect the wider, and less frequent, separations between adjacent words. In addition, under certain circumstances a uni-modal distribution may be produced; treatment of such being further clarified in the Appendix. As the code listing for the function RowXThresh, beginning on page 168 of the Appendix, specifies the two maximums of the bi-modal distribution are used to first identify a threshold separation, step 100, which is used to subsequently classify inter-character versus inter-word separations.

Using the separation threshold, the procedure Merge-Words is then called to merge adjacent boxes within a text row which have a separation in the x-direction of less than the separation threshold, step 102 of FIG. 8. Simply put, the MergeWords procedure (Appendix p. 107) merges all adjacent sets of connected components in each row that are separated by a distance less than the separation threshold. Upon merging adjacent characters within words, the resulting box structure will reflect the boundaries of word tokens within each of the text rows as illustrated, for example, by boxes 66 around the words in FIG. 6. At this point, control is returned to the BoxPage function where an optional operation to eliminate the small non-merged boxes which identify noise within the image may be removed using the KillNoise function beginning on page 79 of the Appendix. Subsequently, the BoxPage function calls the procedure WriteBoxList (Appendix p. 93) to generate a list of box coordinates in reading order (top-to-bottom and left-to-right within each text row), step 104. Each set of coordinates within the box list defines a bounding box 66 which surrounds a word token, picture, punctuation mark, or similar unit of semantic understanding within the input image.

Returning now to FIG. 2, once a token list has been generated, for example, by word boxer 16 which generates the box list representing boundaries of word-based tokens within the image, the list and bitmap image are passed to token or word segmenter 18. In general, segmenter 18 is an image processing system which is capable of dividing the bitmap of input image 10 into a series of smaller bitmap images in accordance with the word or token boundaries specified in the box list. The output from word segmenter 18 would be a series of bitmap images, each image containing the bitmap representation of a word token or similar unit of semantic understanding as identified by the word boxer 16. In a preferred embodiment, word segmenter 18 does not actually generate a separate bitmap for each portion of the input image which is bounded by a word box. Rather, the segmenter simply operates to "window" out or select a portion of the bitmap so as to allow access to the portion of the image defined as being within the boundaries of a particular token box. As previously described, the output of word segmenter 18, a word token, is passed to comparator 24 where the token is compared to another bitmap image from "dictionary" 26 to determine if there is a match between the token image output by segmenter 18 and a word token supplied from the dictionary.

As described herein, a preferred method of comparing the word images employs a Hausdorff-like distance measuring technique related to that described by Huttenlocher et al. in "Comparing Images Using the Hausdorff Distance" (TR 91–1211) June 1991, and "A Multi-Resolution Technique for Comparing Images Using the Hausdorff Distance" (TR 921321), December 1992, both published by the Department of Computer Science, Cornell University and hereby incorporated by reference for their teachings.

Figure 11:
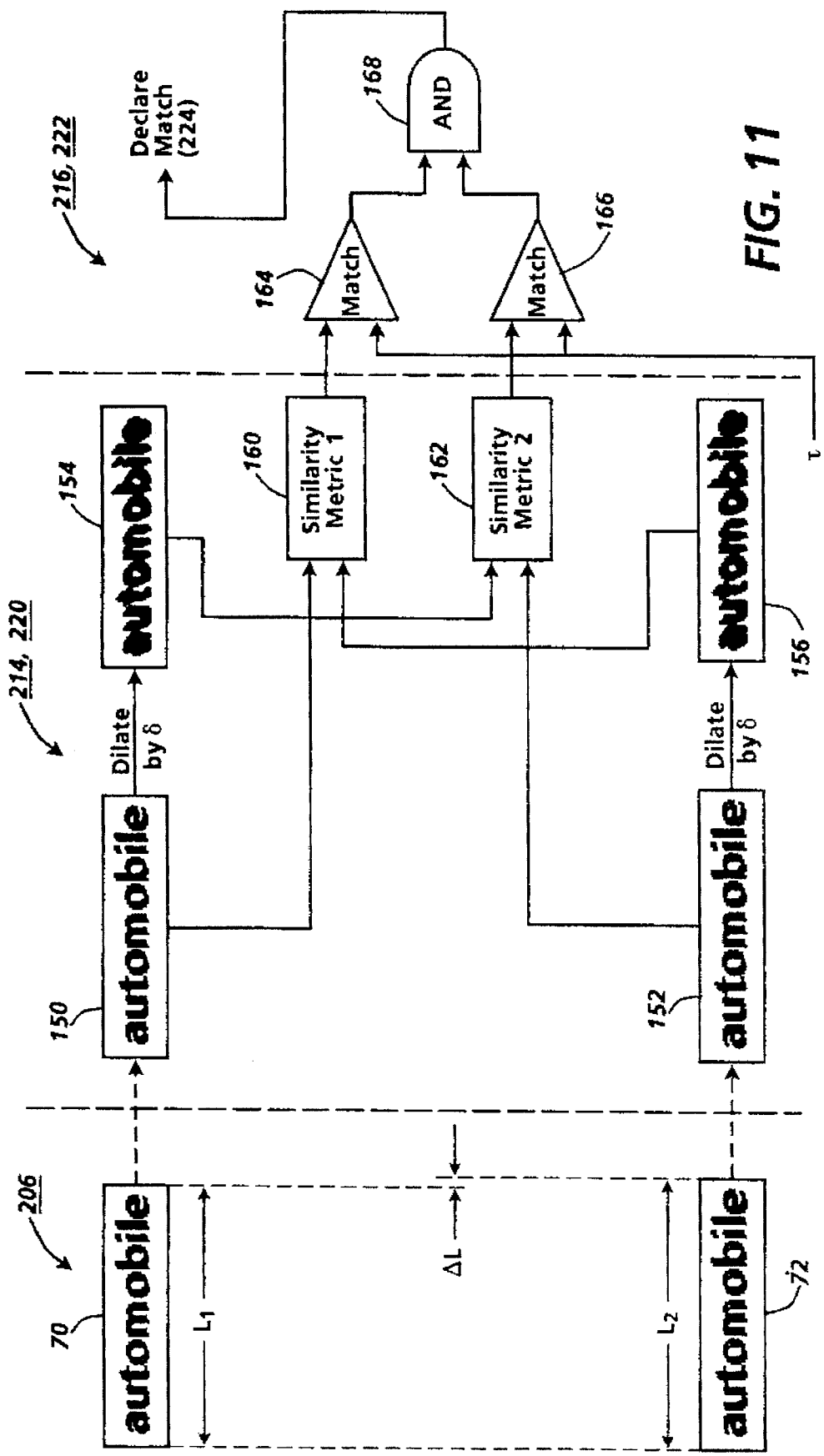
FIG. 11 is a pictorial schematic depicting the processing operations conducted by the comparator of FIG. 2 in accordance with the present invention.
Figure 12:
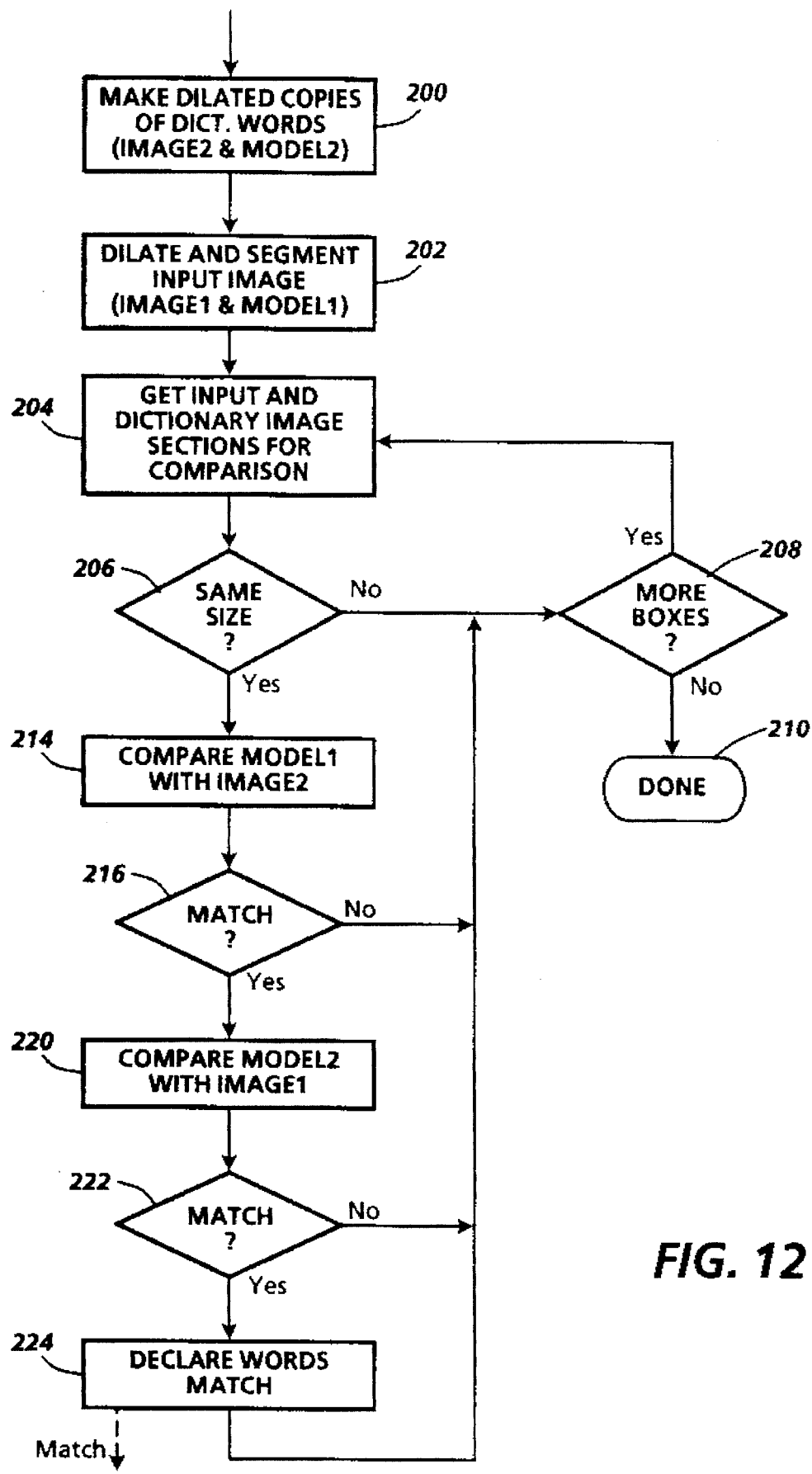
FIG. 12 is a flowchart illustrating the general process used to compare the images within the word boundaries as illustrated in FIG. 11.

In general, the method of comparing the boxed tokens utilizes the process illustrated by FIGS. 11 and 12 for comparison of the components identified to particular boxes. Further details of the preferred embodiment are contained within the Process procedure beginning on page 193 of the Appendix and its related functions. The simplified embodiment described herein is directed toward the determination of whether word-based tokens within an image are the same or different. Each section or bitmap representation of a word token corresponds to the regions defined by the bounding box as previously determined. A standard method of making such a comparison between bitmap sections is commonly known as correlation, where a logical ANDing operation of the two images would be used to determine similarity. The present invention, on the other hand, improves upon the correlation method by using dilation techniques to eliminate the effects of quantization error inherent in the digitization process used to produce the image.

As used hereinafter, the two token image sections which are to be compared are referred to as box1 and box2. These image sections may be two sections from the same image, sections from different images, or a section from an image and a section created electronically from an input string of symbols, a word, or any unit of semantic understanding to form the token. Although represented as a "dictionary" of word images in FIG. 2, the general purpose of block 26 is to provide the token image section (box2) to which another token image section (box1) is to be compared. As illustrated in FIG. 6, the two representations of the word-based tokens for "automobile," 70 and 72, may be compared in accordance with the present invention, wherein one of the representations, 72, would be generated by the "dictionary". Having identified the box1 and box2 sections, 70 and 72 respectively, the existing image section for each will be referred to as the "model" and a dilated version of the model, referred to hereinafter as the "image," will be produced.

As generally illustrated in FIGS. 11 and 12, the technique employed by comparator 24 first compares pixels within model1 (150), the original pixels in the section bounded by box1, with pixels within image2 (156), the dilated representation of the pixels represented by box2, and a first metric is generated from the comparison, block 160. Similarly, the process is then reversed, comparing pixels within model2 (152), the original pixels in the section bounded by box2, with pixels within image 1 (154), the dilated representation of the pixels represented by box1, and a second metric is generated from the comparison, block 162. Subsequently, the two metrics are mathematically processed by blocks 164, 166 and 168 to determine the degree of similarity between the two image sections bounded by box1 and box2.

More specifically, comparator 24 initially replicates the pixels within the boundaries of a word image (box2) specified in the "dictionary" of images 26 in a memory location for the model using the ReadDictionary procedure at page 223. These pixels are referred to hereinafter as model2. The comparator then replicates model2 in a second memory location and dilates it, as shown in FIG. 11, to produce image2 (dilated image 156), step 200. That is, for every "on" or black pixel stored in model2 memory, it turns on, or makes black, its surrounding neighbors in the image2 memory. The exact number of neighbors is specified by a dilation radius that is predefined. As an example, a preferred dilation radius of 1.0 pixels turns on the four abutting neighbors while a radius of 1.4 pixels turns on all eight adjacent, neighboring pixels. Moreover, the higher the dilation radius, the greater potential for an erroneous match between words which are not the same.

Selection of the dilation radius is carried out so as to counteract the quantization error that is typically imposed during the digitization process. In selecting the dilation radius, the desire is to reduce the error introduced by simple correlation approaches (which effectively have a dilation radius=0), while avoiding confusion resulting from the comparison of over-dilated images (i.e., large dilation radius). Hence, preferred dilation radii on the order of 1.0 and 1.4 pixels have been demonstrated to provide an acceptable compromise between the extremes.

Next, the process is repeated to produce the model and dilated image versions for the symbol string to be compared. For example, a copy of the entire input image 10 may be dilated (PackedDilate, Appendix p. 209) as described above and the pixels within the dilated boundaries of every box specified in the box list are copied out of the dilated input image, step 202. These sets of pixels, representing individual dilated "words," are hereinafter referred to as image 1 (dilated portions of the input image, 156) while the original, non-dilated word segments of the input image are hereinafter referred to as model1 (150). As with the box2 images, the pixel representations of words within each image will appear "fatter" and more filled in than the corresponding model.

Once the input and "dictionary" images have had their associated model and dilated images created and stored in memory, a pair of input (box 1) and dictionary (box2) images are selected for comparison at step 204. Next, comparator 24 tests to determine whether the boxes are "reasonably" close in dimensions, step 206 (HausdorffMatch, Appendix p. 203). That is, whether or not the two boxes are within a predefined range in their respective lengths and heights. As depicted in FIG. 11, a dimensional difference $\Delta L$ is determined for the two image sections, where $\Delta L=|L_1-L_2|$. It is also preferable to include a height comparison (not shown) in the size test represented by step 206, and the comparison would be carried out in the same manner as described for the length comparison. In order to allow for the possibility of shifting the images within the boxes relative to one another, to further improve the reliability of the comparison, a larger dimensional difference may be tolerated. If dimensional difference $\Delta L$ is not within the predefined range, a different image pair (input and dictionary) is selected for comparison, step 204, once it has been determined that more boxes (image sections) are available, step 208. Otherwise, assuming the bounding boxes for the selected input and dictionary image pair are approximately the same size, each pair of word boxes is then further compared to see if they match. In general a binary image can be considered to represent a finite set of points, A, where the coordinates of each point of A are represented as an "on" pixel in the binary image. Thus the Hausdorff distance, a measure for comparing point sets, can be seen to be applicable to comparing binary images. In particular, given two finite point sets A and B, the Hausdorff distance is defined as:

H(A,B)=max (h(A,B), h(B,A)), where $$h(A,B) = \max_{a \text{ in } A} \min_{b \text{ in } B} |a-b|$$

and |a–b| is the distance between the two given points a and b.

In effect, the function h(A,B) ranks each point of A based on its distance to the nearest point of B, and then the largest ranked such point (the most mismatched point) specifies the value of the distance. Thus if h(A,B)≦δ(delta), this means that each point of A is within distance δ of some point of B. The function H(A,B) is the maximum of the two asymmetric distances, and thus if H(A,B)≦δ this means that each point of A is within δ of some point of B and vice versa. The Hausdorff distance thus provides a measure of similarity of two binary images (or finite point sets), as larger values of δ indicate less similarity between the images, as described by Huttenlocher et al. in "Comparing Images Using the Hausdorff Distance" (TR 91-1211) June 1991, and "A Multi-Resolution Technique for Comparing Images Using the Hausdorff Distance" (TR 92-1321), December 1992.

In comparing bitmap images of tokens, it has been determined that small values of δ are preferable as they account for the quantization noise in the digitization process (the random turning on or off of pixels at the boundary of a token), but still require the images to be relatively similar. The preferred implementation of the Hausdorff distance computation for small values of delta uses dilation in conjunction with a logical ANDing operation. A dilation of a binary image A by some radius δ consists of replacing each "on" or "black" pixel of the image A by a circle of radius δ. δ=1.0 is used to represent the four immediate (horizontal and vertical) neighbors of a pixel, while δ=1.4 represents the eight immediate (horizontal, vertical and diagonal) neighbors of a pixel. These are the preferred values of δ for counteracting quantization noise.

Let B' be the dilation of A by δ, then it is clear that h(A,B)≦δ exactly when A^B'=A, where ^ denotes the logical AND of A and B'. That is, since every black point of A must be within distance δ of some black point of B, every black point of A must be coincident with some black point of B'. Hence it can be decided whether h(A,B)≦δ, and thus analogously H(A,B)≦δ, by simply dilating B (and analogously A) by δ, and computing the logical AND with A (analogously B).

In general, there may be some points of A that are not near any points of B or vice versa. Thus the Hausdorff distance is generalized to replace the maximization operation with the computation of a quantile (e.g., median or other percentile) as described by Huttenlocher et al. in "Comparing Images Using the Hausdorff Distance" (TR 91-1211) June 1991, and "A Multi-Resolution Technique for Comparing Images Using the Hausdorff Distance" (TR 92-1321), December 1992. This definition is:

$$h'(A,B) = \underset{a \text{ in } A}{k^{th}} \min_{b \text{ in } B} |a-b|$$

This computes the $k^{th}$ largest rather than the maximum (the largest) of the distances from each point of A to the nearest point of B. It thereby allows some number, or some fraction, of the points of A to be ignored in computing the distance. If there are m points in the set A, then when k=m this definition is the same as h(A,B). But in general if k=τ*m, for some value of τ(tau), where 0≦τ≦1, then m−k=(1−τ)*m of the points of A are ignored (i.e., do not have to lie near points of B). This can be defined analogously for H(A,B). In a preferred embodiment, τ is set to allow up to four percent of A to disagree with B' (τ≦0.96), or vice versa.

The preferred implementation of this computation for small values of δ is again a dilation and logical AND, but in this case there may be points of A that do not overlap with B' (and vice versa). The portion of these non-overlapping points must be less than the specified fraction τ. Thus we compute h'(A,B) by comparing the number of black pixels in A and in A^B'. Let p be the number of black pixels in A, and q be the number of black pixels in A^B', then $q/p \geq \delta$ exactly when $h'(A,B) \leq \tau$ for the given value of $\tau$.

It should also be noted that the present invention includes the possibility of evaluating the Hausdorff distance when A and B are shifted relative to one another in order to find the minimum value of the Hausdorff distance (the best possible alignment). This technique is similar to relative shifting employed in commonly known correlation operations, except that it notably differs from correlation in one important aspect—it explicitly tolerates quantization noise. In correlation, there is no notion of proximity between points of A and points of B (i.e., if $\delta=0$ is used then this restricted case is more like correlation).

Using the following generalized procedure to execute the aforedescribed technique, executed by the remainder of the HausdorffMatch and TestMandlMatch procedures found on Appendix pages 203 and 201, respectively, the two image sections may be compared to determine if they match:

1) model1 is superimposed over image2;
2) the number of black model1 pixels matching black image2 pixels is counted and then divided by the total number black of model1 pixels (step 214);
3) if the percentage of matching black pixels is above a predefined threshold percentage $\tau$ (preferably $\tau \approx 0.96$), the boxes are determined to "match" in the first instance (step 216); then
4) model2 is superimposed over image1;
5) the two image sections are again compared as in step 2 above and a second percentage of matching black pixels determined (step 220);
6) if this second percentage is above the predefined threshold percentage $\tau$, the boxes are determined to "match" in the second instance (step 222); and
7) whenever the image sections match in both instances, they are considered to be the same word, and an indication of the word match is generated by the comparator 24 of FIG. 2 (step 224).

In addition to the embodiments previously described, the instant invention may be employed, as the Appendix reflects, as a comparison technique which develops equivalence classes of word tokens within an image. It is believed that the present invention may be used as a preprocessing operation for an OCR system which would thereby facilitate speed and accuracy improvements in available OCR systems. As yet another alternative, the instant invention may be employed to identify multiple occurrences of word tokens and replace subsequent occurrences of such words with an icon of reduced size so as to reduce the overall size of the data file needed to hold large documents. Such a system is disclosed in international patent application No. WO-93/12610 for "Method and Apparatus for Compression of Images" by Peter B. Mark et al., published Jun. 24, 1993.

In the preferred embodiment, the program which compares the box sizes to build a library proceeds by building classes of boxes or image sections that may be matched (i.e. boxes that are believed to be the same token in both the input image and the "dictionary" image). For example, the procedure AssignBoxesToWords (Appendix p. 219) creates a data structure suitable for classifying the token image sections by their length (width), so as to improve the speed at which pairs of tokens may be compared. Although described with respect to the comparison of a portion of an input image with a known or "dictionary" token, the present invention may also compare tokens within the same or other images, for example image sections 70 and 72 in FIG. 6, and should not be viewed as limited to the example offered for the purposes of illustrating the operation of the present invention.

In recapitulation, the present invention is a method for comparing two image sections or tokens consisting of a plurality of image signals, or pixels, where each token represents one or more connected symbols to identify similar tokens. The invention further operates without the need for individually detecting and/or identifying the characters or symbols making up the tokens. The method relies upon the detection of components within an image to first determine token boundaries and then applies a two stage process where dilated images are compared with model representations of the token to determine the relative similarity therebetween.

It is, therefore, apparent that there has been provided, in accordance with the present invention, a method for the comparison of tokens defining image regions comprised of components or similar symbols. The invention has been described with reference to a preferred embodiment, namely a software implementation designed to be implemented in a computer system, employing one or more microprocessor or arithmetic processing devices for the execution of predefined instructions to achieve the operations hereinbefore described with respect to processing of the image data. In addition, the invention may also be achieved using specialized hardware which is designed to implement the operations described herein. Furthermore, the invention has been described as a portion of a larger word recognition system. However, as previously noted, the present invention has the potential for use in text and image editing, or related systems. Practically speaking, any system requiring the identification, classification, or grouping of tokens or strings of symbols might utilize the present invention. Finally, the invention has been described with respect to textual images. However, this invention would also be applicable for images that include non-textual image portions as well. Obviously, modifications will occur to others upon reading and understanding the specification taken together with the drawings. This embodiment is but one example, and various alternatives, modifications, variations or improvements may be made by those skilled in the art from this teaching which is intended to be encompassed by the following claims.

We claim:

1. A method performed by a computer for comparing at least two image sections having a plurality of image signals, each image section representing a token, to identify similar tokens, each token representing a unit of semantic understanding comprising the steps of:

(a) rasterizing, using source image derivation system, a document to produce an image section representing a token;

(b) storing image signals of an image section representing a first token in a first model memory;

(c) dilating the image signals representing the first token to produce a dilated representation of the first token and storing the detailed representation of the first token in first image memory;

(c) storing image signals of an image section representing a second token in second model memory;

(e) dilating the image signals of an image section representing the second token to produce a dilated representation of the second token and storing the dilated representation of the second token in a second image memory;

(f) comparing the image signals stored in the first model memory with the images signals stored in the second image memory to determine a first similarity metric;

(g) comparing the image signals store in the second model memory with the image signals stored in the first image memory to determine a second similarity metric; and (h) indicating whether the first token is similar to the second token in response to the first and second similarity metrics.

2. The method of claim 1, wherein the steps of producing a dilated representation of the token comprises the steps of:

(a) copying the image signals represented in the model memory into the image memory; and (b) dilating the image signals in the image memory by a predetermined dilation radius so as to produce a dilated representation of the image signals therein.

3. The method of claim 2, wherein the step of dilating the image signals further comprises the step of using a predetermined dilation radius not greater than 1.4 to produce the dilated representation of the image signals.

4. The method of claim 1, wherein the step of comparing the image signals stored in the model memory with the image signals stored in the image memory to determine a similarity metric includes the steps of:

(a) counting the total number of black image signals in the model memory;

(b) logically ANDing the image section stored in the model memory with the image section stored in the image memory;

(c) counting the number of black image signals which are present in the logically ANDed image sections to determine the number of matching black signals; and (d) dividing the number of matching black signals by the total number of black image signals to determine the similarity metric.

5. The method of claim 1, wherein the step of indicating whether the first token is similar to the second token includes the step of identifying the first and second tokens as being similar whenever both the first similarity metric and the second similarity metric are greater than a predefined threshold.

6. The method of claim 1, further comprising the step of extracting image signals representing the first token from rasterized data defining an image.

7. The method of claim 6, further comprising the step of extracting image signals representing the second token from rasterized data defining the image.

8. The method of claim 6, wherein the step of extracting image signals representing the first token from rasterized data defining the image comprises the steps of:

(a) finding connected components within the image;

(b) identifying boundaries about each group of connected components within the image;

(c) locating text rows using the boundaries identified in step (b); and (d) combining adjacent groups of connected components within the text rows located in step (c), based upon a relationship between the boundaries of adjacent groups, so as to segment the image by word tokens.

9. The method of claim 1, wherein the image signals representing a first token are identified as falling within a first bounding box and the image signals representing a second token are identified as falling within a second bounding box, further comprising the steps of:

(a) comparing a common dimension of the first and second bounding boxes; and (b) determining that the first and second tokens may be similar if the common dimensions of the first and second bounding boxes are within a predefined tolerance, otherwise determining that the first and second tokens are dissimilar.

10. The method of claim 1, further comprising the step of extracting image signals representing the first token from rasterized data defining an image wherein the first token is defined as a string of symbols.

11. The method of claim 10, further comprising the step of extracting image signals representing the second token from rasterized data defining an image wherein the second token is defined as a string of symbols.

12. A method performed in a programmable computer for comparing at least two image sections, each image section consisting of a plurality of image signals, wherein a first image section represents a token from an unknown image object and a second image section represents a token from a known image object stored in a dictionary of images and where a token represents a unit of semantic understanding, to identify the unknown token as matching the token previously stored in the dictionary of images, comprising the steps of:

a) storing image signals of an image section representing an unknown token in a first model memory;

(b) dilating the image signals representing the unknown token to produce a dilated representation of the unknown token and storing the dilated representation of the unknown token in a first image memory;

(c) replicating image signals of an image section representing a known token stored in a dictionary of images to a second model memory;

(d) dilating the image signals representing the known token to produce a dilated representation of the second token and storing the dilated representation of the second token in a second image memory;

(e) comparing the image signals stored in the first model memory with the image signals stored in the first image memory to determine a second similarity metric;

(f) comparing the image signals stored in the second model memory with the image signals stored in the first image memory to determine a second similarity metric; and (g) indicating whether the unknown token is similar to the known token in response to the first and second similarity metrics.

13. The method of claim 12, wherein the steps of producing a dilated representation of the token comprises the steps of:

(a) replicating the image signals represented in the model memory in the image memory; and (b) dilating the image signals in the image memory by a predetermined dilation radius so as to produce a dilated representation of the image signals therein.

14. The method of claim 13, wherein the step of dilating the image signals further comprises the step of using a predetermined dilation radius not greater than 1.4 to produce the dilated representation of the image signals.

15. The method of claim 12, wherein the step of comparing the image signals stored in the model memory with the image signals stored in the image memory to determine a similarity metric includes the steps of:

(a) counting the total number of black image signals in the model memory;

(b) logically ANDing the image section stored in the model memory with the image section stored in the image memory;

(c) counting the number of black image signals which are present in the logically ANDed image section to determine the number of matching black signals; and (d) dividing the number of matching black signals by the total number of black image signals to determine the similarity metric.

16. The method of claim 12, wherein the step of indicating whether the unknown token is similar to the known token includes the step of identifying the unknown and known tokens as being similar whenever both the first similarity metric and the second similarity metric are greater than a predefined threshold.

17. The method of claim 12, further comprising the step of extracting image signals representing the unknown token from rasterized data defining the image.

18. The method of claim 17, wherein the step of extracting image signals representing the unknown token from rasterized data defining the image comprises the steps of:

(a) finding connected components within the image;

(b) identifying boundaries about each group of connected components within the image;

(c) locating text rows using the boundaries identified in step (b); and (d) combining adjacent groups of connected components within the text rows located in step (c), based upon a relationship between the boundaries of adjacent groups, so as to segment the image by tokens.

19. The method of claim 12, wherein the image signals representing an unknown token are identified as falling within a first bounding box and the image signals representing a known token are identified as falling within a second bounding box, further comprising the steps of:

(a) comparing a common dimension of the first and second bounding boxes; and (b) determining that the tokens may be similar if the common dimensions of the first and second bounding boxes are within a predefined tolerance, otherwise determining that the first and known tokens are dissimilar.

20. The method of claim 12, further comprising the step of extracting image signals representing the unknown token from rasterized data defining an image, wherein the first token is defined as a string of symbols within the image.

21. The method of claim 20, further comprising the step of rasterizing image signals representing the known token as a function of a known string of symbols that are to be represented by the known token.

* * * * *